United States Patent [19]

Takahashi et al.

[11] Patent Number: 4,524,015

[45] Date of Patent: Jun. 18, 1985

[54] OXYGEN ABSORBENT

[75] Inventors: Hideyuki Takahashi; Toshio Komatsu; Yoshiaki Inoue, all of Tokyo, Japan

[73] Assignee: Mitsubishi Gas Chemical Company, Inc., Tokyo, Japan

[21] Appl. No.: 521,167

[22] Filed: Aug. 5, 1983

[30] Foreign Application Priority Data

Aug. 9, 1982 [JP] Japan .................... 57-138241
Aug. 17, 1982 [JP] Japan .................... 57-142292

[51] Int. Cl.$^3$ .................... C09K 15/02; A23B 7/14; A23D 5/04
[52] U.S. Cl. .................... 252/188.28; 252/397; 252/184
[58] Field of Search .................... 252/188.28, 397, 184

[56] References Cited

U.S. PATENT DOCUMENTS 4,113,652  9/1978  Yoshikawa et al. .......... 252/188.28
4,299,719  11/1981 Aoki et al. .................... 252/188.28
4,384,972  5/1983  Nakamura et al. .......... 252/188.28

Primary Examiner—John Kight
Assistant Examiner—Marvin L. Moore
Attorney, Agent, or Firm—Browdy and Neimark

[57] ABSTRACT

A particulate or granular oxygen absorbent comprising at least one ascorbic compound selected from ascorbic acid, ascorbic acid salts or mixtures thereof, an alkali metal carbonate, an iron compound, carbon black and water and the absorbent coated with a finely divided powder are disclosed.

8 Claims, No Drawings

OXYGEN ABSORBENT

BACKGROUND OF THE INVENTION

This invention relates to particulate oxygen absorbent having good flowability.

In order to preserve foodstuffs, such as vegetables, fish, shellfish, meats, processed foodstuffs, such as potato chips, cakes, peanuts, etc., and so on, it is necessary to prevent the foodstuffs from becoming moldy and from putrefying. Prior art methods have used freezer storage, cold storage, vacuum packaging and replacing the gas present in the inner part of packaging by an inert gas for preventing foodstuffs from becoming moldy and putrefying. Additives, such as anti-oxidant, have been used for preserving foodstuffs. Recently, governments have started to regulate the use of additives for food, since it has been realized that some additives are injurious to humans. The freezer storage method requires large-scale apparatus and complicated operation, so the freezer storage method is costly.

Molds or eumycetes, bacteria and higher organisms such as insects tend to disturb preservation of foodstuffs. These mold, eumycetes, bacteria and insects live and grow in the presence of oxygen and cause putrefaction and change in quality of foodstuffs.

Therefore, if oxygen can be selectively removed from the atmosphere in which the foodstuffs are packed, the problem of putrefaction and change in quality of foodstuff can be overcome, and it will become possible to preserve foodstuffs for a long time.

The prior oxygen absorbents include ascorbic acid type oxygen absorbents and iron type oxygen absorbents. The prior ascorbic acid type oxygen absorbents comprise ascorbic acid or an ascorbate an alkali carbonate or an alkali hydroxide, an iron compound, water and a filler such as activated carbon.

However, prior ascorbic acid type oxygen absorbents have poor flowability, so they have the following disadvantages for a practical use. In general, oxygen absorbents are packed in a permeable bag. The permeable bag containing an oxygen absorbent is packed in an impermeable bag with the foodstuff. In general, oxygen absorbents are normally in particulate or granular form. A die roll type or perseal automatic packaging machine is used for packing such oxygen absorbent in a permeable bag.

However, if the oxygen absorbent in powder form has poor flowability, exact metering is difficult in automatic packaging, and in addition, part of the oxygen absorbent composition adheres to the sealed portion of a packing material, which is not only uneconomical but also gives an unseemly appearance to the final product. Attempt has been made to granulate oxygen absorbent in order to overcome such shortcomings. However, since the prior oxygen absorbent contains filler, such as activated carbon, it is necessary to use a large amount of a binder in order to granulate it. A large amount of a binder contained in the absorbent lowers the oxygen-absorbing property.

SUMMARY OF THE INVENTION

The present inventors have carried out wide research to find a particulate oxygen absorbent having sufficient flowability. We found that if carbon black is used as a filler for an oxygen absorbent, a particulate or granular oxygen absorbent with good flowability can be prepared. We also found that its flowability can be improved by coating the resulting particulate or granular oxygen absorbent with finely divided powder which is only slightly soluble in water.

A object of this invention is to provide a particulate or granular oxygen absorbent having flowability enough to pack it with an automatic packaging machine.

This invention relates to a particulate or granular oxygen absorbent comprising at least one ascorbic compound selected from ascorbic acid, ascorbic acid salts or mixtures thereof, an alkali metal carbonate, an iron compound, carbon black and water.

This invention also relates to a finely divided powder-coated, particulate or granular oxygen absorbent comprising at least one ascorbic compound selected from ascorbic acid, ascorbic acid salts or mixtures thereof, an alkali metal carbonate, an iron compound, carbon black and water.

DETAILED DESCRIPTION OF THE INVENTION

The term "oxygen absorbent" in the specification and the claim means an agent for absorbing or removing oxygen.

The term "particulate" as used herein also means "granular".

The ascorbic compounds include, for example, L-ascorbic acid, sodium L-ascorbate and sodium D-isoascorbate. One or more ascorbic compound may be used.

The alkali metal carbonates include $Na_2CO_3$, $NaHCO_3$, $K_2CO_3$ and $KHCO_3$. The carbonate may be used alone or as a mixture of two or more carbonates. The amount of alkali metal carbonate employed may be in the range of 10–500 parts by weight, preferably 30–250 parts by weight per 100 parts by weight of the ascorbic compound.

When $NaHCO_3$ or $KHCO_3$ is used as an alkali metal carbonate, or when a small amount of $Na_2CO_3$ or $K_2CO_3$ is used as the carbonate, the oxygen asborbent absorbs oxygen and at the same time generates $CO_2$.

The iron compounds include ferrous salts and ferric salts. Examples of the iron compounds include $FeCl_2$, $FeCl_3$, $FeSO_4$, $Fe_2(SO_4)_3$ and ferrous or ferric salts having water of hydration. Ferrous or ferric salts having water of hydration are preferable. The amount of an iron compound employed may be in the range of 1–200 parts by weight, preferably 10–100 parts by weight per 100 parts by weight of ascorbic compound.

Carbon black for rubber, coloration or battery may be used in the present invention. Carbon black having a particle size finer than 100 mesh is preferable. The amount of carbon black employed may be in the range of 10–500 parts by weight, preferably 50–200 parts by weight per 100 parts by weight of ascorbic compound.

The granular oxygen absorbent of this invention may be prepared by a blending granulating machine, extruding granulating machine, fluidized bed granulating machine, rolling granulating machine, stirring granulating machine or grinding granulating machine. An extruding granulating machine or rolling granulating machine is preferable.

The order of adding each component constituting oxygen absorbent is not critical for preparing an oxygen absorbent composition. In general, it is preferable that water be the last component to be added and that an iron compound is dissolved in water before addition.

The finely divided powder which is used for coating a granular oxygen absorbent includes activated carbon, gypsum, calcium carbonate, seolite, perlite, silica and iron oxides which have a size finer than 100 mesh and which are only slightly soluble in water.

The term "coating" as used herein means covering part or all of the particulate oxygen absorbent with fine particles of a coating material. Coating of the granular oxygen absorbent with finely divided powder as mentioned above may be carried out by blending the two components in an S-shaped blender, V-shaped blender, coating pan or concrete mixer.

A coating pan or concrete mixer is preferable. The blending may be carried out by using a rolling granulating machine.

The present invention is further illustrated by the following Examples. However, this invention should not be limited by these examples. The parts in the Examples are based on weight unless otherwise specified.

EXAMPLE 1

| | |
|---|---|
| Sodium ascorbate | 10 parts |
| Carbon black | 10 parts |
| $Na_2CO_3$ | 5 parts |
| $NaHCO_3$ | 12 parts |
| Ferrous sulfate heptahydrate | 2 parts |

The above components were blended in a cokneader for 5 minutes, followed by adding 6 parts of water to the mixture and then blending for an additional 5 minutes. Thereafter, the mixture was granulated in a cylinder type extruding granulating machine (screen size: 1 mm) to obtain granular oxygen absorbent.

The resulting oxygen absorbent (5 grams) was packed in a permeable bag composed of perforated polyethylene-laminated paper. The bag was packed in a 250 ml polyvinylidene chloride-coated oriented polypropylene-polyethylene laminate bag. After one day, the concentration of oxygen in the bag was less than 0.1% and the concentration of $CO_2$ was 24.1%.

EXAMPLES 2 AND 3 AND COMPARATIVE RUN 1

TABLE 1

| | Comparative run 1 | Example 2 | Example 3 |
|---|---|---|---|
| Sodium ascorbate | 10 parts | 10 parts | 10 parts |
| Carbon black | — | 10 parts | 10 parts |
| Activated carbon | 10 parts | — | — |
| $Na_2CO_3$ | 5 parts | 5 parts | 5 parts |
| $NaHCO_3$ | 12 parts | 12 parts | 12 parts |
| $FeCl_2.4H_2O$ | 2 parts | 2 parts | 2 parts |

The above compositions were blended in a cokneader for 5 minutes, followed by adding 6 parts of water to the mixture and then blending for an additional 5 minutes. Thereafter, the mixture was granulated in a cylinder type extruding granulating machine (screen size: 1 mm) to obtain granular oxygen absorbent.

Composition of Comparative run 1 can not be granulated.

Granular oxygen absorbent of Example 3 was placed in a coating pan, and 3 parts of perlite powder was added to the oxygen absorbent. The granular absorbent was coated with the perlite powder for 3 minutes.

Flowability test and automatic packing test of the three samples were carried out.

The resulting three samples of oxygen absorbent composition were checked for their flowability by dropping them through two glass funnels having bottom openings 15 mm and 10 mm in diameter. The samples were also subjected to an automatic packing test using pas-permeable packing materials made of a limination of perforated polyethylene sheet and paper. The results are shown in the following table.

| Sample No. | 1 | 2 | 3 |
|---|---|---|---|
| Shape | powder | granules | granules |
| Flowability | | | |
| 15 mm$^\emptyset$ | did not drop even under vibration | dropped | dropped |
| 10 mm$^\emptyset$ | did not drop even under vibration | dropped under vibration | dropped |
| Automatic packing | difficult | possible | possible |

The resulting oxygen absorbent (5 grams) of Examples 2 and 3 were packed in a permeable bag composed of perforated polyethylene-laminated paper. The bag was packed in a 250 ml polyvinylidene chloride-coated oriented polypropylene-polyethylene laminate bag. After one day, the concentrations of oxygen in the bag were less than 0.1% and the concentrations of $CO_2$ was 22.5% (Example 2) and 21.5% (Example 3).

What is claimed is:

1. A particulate or granular oxygen absorbent comprising at least one ascorbic compound selected from ascorbic acid, ascorbic acid salts or mixtures thereof, an alkali metal carbonate, an iron compound, carbon black and water.

2. The absorbent of claim 1 wherein the iron compound is used in an amount of 1–200 parts by weight per 100 parts by weight of the ascorbic compound.

3. The absorbent of claim 1 wherein the alkali metal carbonate is used in an amount of 10–500 parts by weight per 100 parts by weight of the ascorbic compound.

4. The absorbent of claim 1 wherein carbon black is used in an amount of 10–500 parts by weight per 100 parts by weight of the compound.

5. A finely divided powder-coated, particulate or granular oxygen absorbent comprising at least one ascorbic compound selected from ascorbic acid, ascorbic acid salts or mixtures thereof, an alkali metal carbonate, an iron compound, carbon black and water.

6. The absorbent of claim 5 wherein the iron compound is used in an amount of 1–200 parts by weight per 100 parts by weight of the ascorbic compound.

7. The absorbent of claim 5 wherein the alkali metal carbonate is used in an amount of 10–500 parts by weight per 100 parts by weight of the ascorbic compound.

8. The absorbent of claim 5 wherein carbon black is used in an amount of 10–500 parts by weight per 100 parts by weight of the ascorbic compound.

* * * * *